United States Patent [19]

Jones

[11] 4,313,716
[45] Feb. 2, 1982

[54] ARTICULATED, ENERGY CONVERTING STRUCTURE

[75] Inventor: Asberry B. Jones, Slidell, La.

[73] Assignee: Texaco Inc., White Plains, N.Y.

[21] Appl. No.: 37,619

[22] Filed: May 10, 1979

[51] Int. Cl.³ .......................... F04B 17/00; E02B 9/08
[52] U.S. Cl. .................................. 417/331; 417/526;
  417/527; 417/469; 60/500; 60/505; 60/506
[58] Field of Search ................. 417/53, 331, 332, 330,
  417/333, 469, 526, 527; 60/497, 505, 506, 500,
  501; 290/42, 53

[56] References Cited

U.S. PATENT DOCUMENTS

| | | | |
|---|---|---|---|
| 2,407,790 | 9/1946 | LeTourneau | 417/526 X |
| 3,151,564 | 10/1964 | Rosenberg | 60/499 |
| 4,023,515 | 5/1977 | Tharaldson | 417/332 |
| 4,098,084 | 7/1978 | Cockerell | 417/332 X |
| 4,125,346 | 11/1978 | Pickle | 417/332 |

FOREIGN PATENT DOCUMENTS

| | | | |
|---|---|---|---|
| 807281 | 1/1959 | United Kingdom | 60/500 |
| 905088 | 9/1962 | United Kingdom | 417/526 |
| 1542251 | 3/1979 | United Kingdom | 60/506 |

*Primary Examiner*—Richard E. Gluck
*Attorney, Agent, or Firm*—Carl G. Ries; Robert A. Kulason; Robert A. Burns

[57] ABSTRACT

An articulated marine structure for an offshore body of water which is subject to wave movement. The structure includes at least two floating elements which are pivotally joined along a common edge to permit relative movement between the respective elements in response to wave action. An energy accumulator is operably connected to the respective floats, and is actuated by movement of either float whereby to initiate conversion of wave energy into an alternate, usable energy form.

2 Claims, 5 Drawing Figures

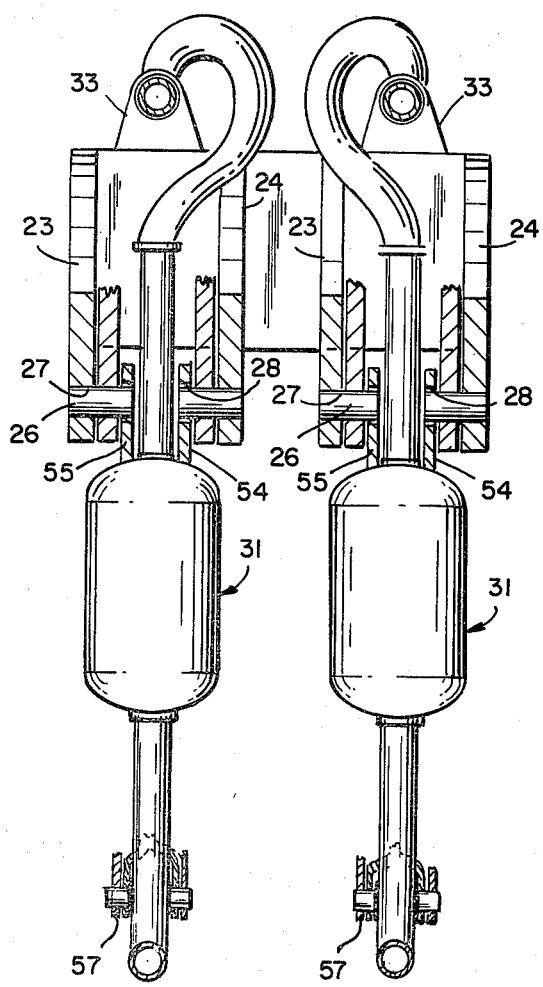

ARTICULATED, ENERGY CONVERTING STRUCTURE

BACKGROUND OF THE INVENTION

The perpetually moving seas constitute an unlimited source of potentially usable energy. Such a source is conceivably available for use without fear of depletion. Further, the endless motion and the moving waters, particularly those adjacent to a shore, represent vast amounts of potential power if it can be harnessed and controlled.

While this readily available energy is presently extracted and utilized to a minor extent, the major portion remains unharnessed. Once a wave washes onto a shore, its potential energy is, for all practical purposes, dissipated.

Toward capturing at least some of this otherwise lost energy represented by an ocean's wave motion, the present system is provided. The instant system thus comprises a safe and relatively desirable means for constantly monitoring and extracting at least a portion of the ocean's wave power. Without such extraction, the power would be completely dissipated by waves breaking on the shore, and lost.

The wave conversion system herein described functions basically in a floating attitude at the water's surface. Operably, it comprises at least two, and preferably a series of floats, adjacent of which are pivotally connected along a common edge.

Relative pivotal movement between said adjacently hinged units in response to a wave passing thereunder is translated into physical movement. The latter in turn actuates a motion accumulator. Thereafter, said accumulations can be immediately converted into a usable energy form, or transmitted to a central accumulator for conversion to an alternate energy form.

It is therefore an object of the invention to provide means for harnessing potential power represented by wave movement at an ocean's surface. A further object is to provide means for continuously monitoring and extracting potential power as the wave moves toward a shore. A still further object is to provide a floatable, articulated marine structure which is capable of responding to movement of an offshore body of water and converting such movement into a usable energy form.

DESCRIPTION OF THE DRAWINGS

In the drawings

FIG. 3 a segmentary view in partial cross section showing a portion of FIG. 2.

FIG. 4 is an enlarged segmentary view in cross section taken along line 4—4 in FIG. 2.

The basic objectives of the invention are achieved by providing an articulated marine, raft-like structure which is capable of floatably supporting itself in an offshore body of water. The structure includes a plurality of members such as discrete rafts which are positioned in such manner as to limit displacement thereof in the water. Said members, however, are mutually connected one to the other, in a way that permits limited pivotal movement between adjacent units.

Energy conversion or accumulator means carried on the floating structure are actuated in response to relative pivotal movement by adjacent floating members. Thus, as a wave passes beneath the respective floating members, the latter will each be sequentially displaced in response to the wave's buoyant force. The resulting movement is converted to an alternate form of energy such as hydraulic, electrical, or otherwise.

Figure 1:
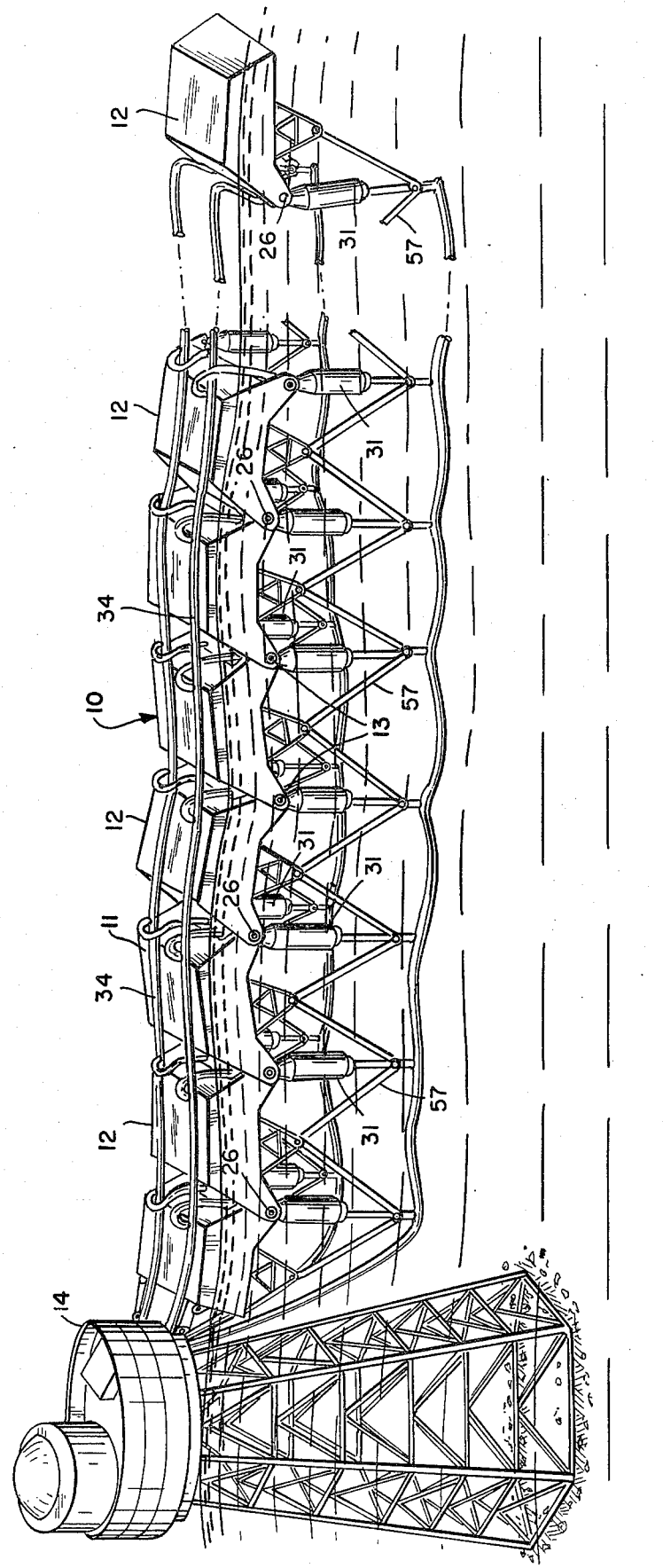
FIG. 1 represents an environmental sketch of the present system anchored at an offshore body of water.

In one embodiment of the present system, an example of the floating raft presently contemplated, is shown in FIG. 1. The elongated, articulated, marine structure 10 is positioned in a tethered, floating attitude. The structure comprises in essence a series of individual floats or floating members 11 and 12, each of which is operably engaged with the next adjacent float. The engagement is preferably achieved by way of a suitable means such as a hinge assembly 13, disposed along a common edge. The latter permits independent, though limited movement of the raft.

Illustrative of the present tethered concept, one end of structure 10 is anchored to a fixed unit such as a piled-in structure or tower 14. Thus, the individual floating members or rafts 11 and 12, are free to swing as a unit about the fixed structure 14 in response to a variation in the direction of wave travel.

In an alternate embodiment, the power generating equipment can be disposed within the confines of the respective floats 11 and 12. Such an arrangement suggests certain conversions which would eliminate or reduce long connecting lines.

It is appreciated that changing of the direction of water flow caused by tide reversal or other natural phenomena, will contribute to the positioning of the floating raft assembly 10. However, the primary factor which normally regulates water movement is the wind direction at the water's surface.

Normally a floating raft 10 of the type contemplated would be anchored with its fixed end offshore and the raft streaming in a direction toward the shore, or in the direction of prevailing winds. Thus, as each progressive wave approaches the shore it passes beneath each float to sequentially elevate and lower the units 11 and 12.

Figure 2:
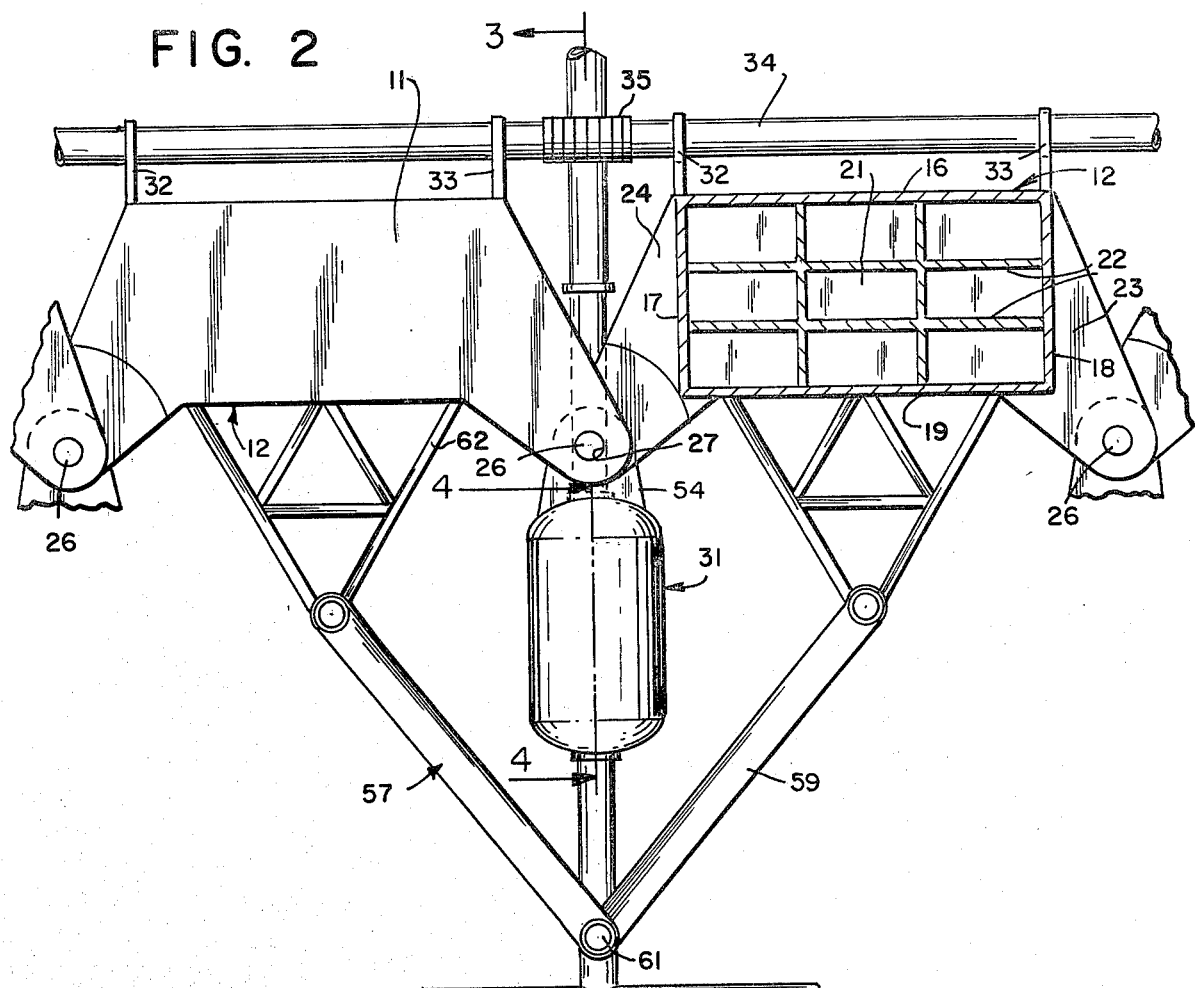
FIGS. 2 and 2A are enlarged sectional views of a portion of FIG. 1.
Figure 2A:
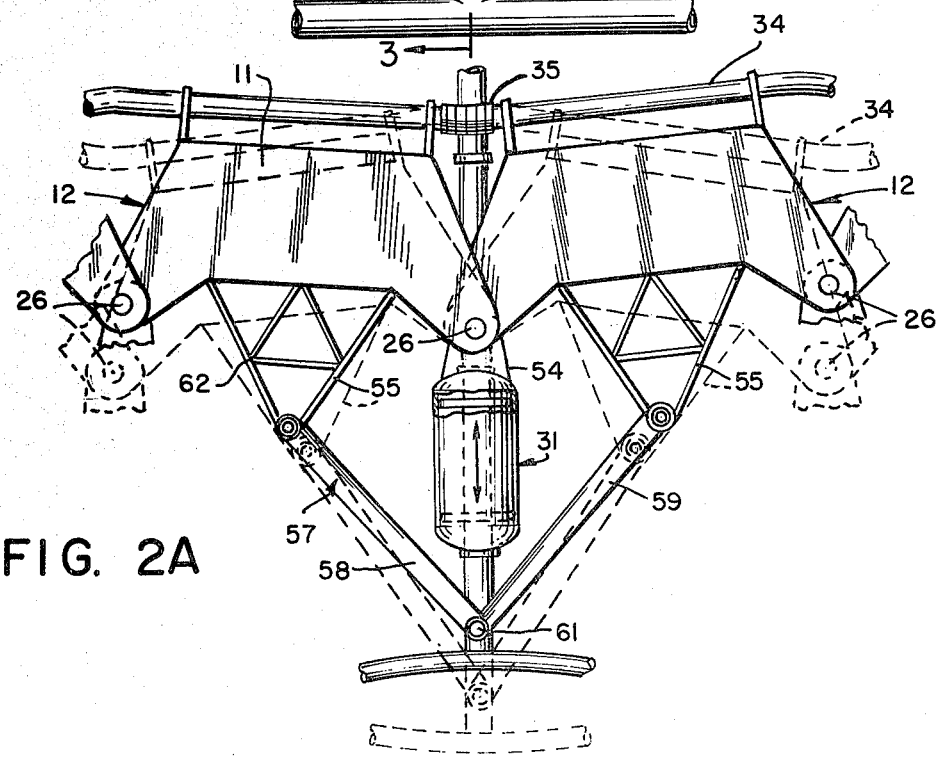

The respective float members or elements 11 and 12 are relatively simple in construction. In one embodiment they comprise a metallic rectangular configuration adapted to float at the water's surface. Referring to FIG. 2, each of said floats, 12 for example, comprises an upper deck 16 which is supported by sides 17 and 18. A lower floor 19 is connected to the respective sides to define an inner buoyancy compartment 21. The respective members of the float are sealably joined to maintain the water tight integrity of compartment 21. The latter can be provided with internal support braces 22 which are suitably disposed to reinforce the unit.

Each adjacent side of the respective floats is provided with downward extending hinge projections such as 23 and 24. The latter are adapted to accommodate one or more hinge elements such as a pin or shaft 26. Thus, each projection 23 and 24 is further provided with a suitable journal or hinge pin opening 27. The hinge assembly 13 comprises a plurality of short pin-like members. Alternately it can comprise a unitary elongated shaft-like member which extends across the entire float.

In conjunction with accumulator 31, float 12 upper deck is provided with a plurality of spaced apart conduit supports 32 and 33. Said supports function to maintain a fluid carrying line or conduit 34 in place, even during the most violent or erratic motion of the float members.

Since the float members will be in a virtually constant state of movement, line 34 can be provided with a degree of flexibility. However, said line 34 can also be provided with a rigid construction having a series of flexible segments 35 which are capable of twisting and turning as the float movement dictates. These segments would serve to communicate the respective fixed, rigid portions of line 34.

The number of said feed conduits 34 which are carried along deck 16 is determined primarily by the number of energy converter units 31 employed. In any event, said feed conduits 34 extend for the length of the upper surface of the structure 10 and terminate at the anchored platform 14.

When a conduit 34 terminates at an accumulator or similar converter on the platform 14, the conduit usually functions to conduct a pressurized stream of water to the latter. Said stream of water usually is under a sufficient head of pressure to permit the accumulation to be fed to a turbine or similar apparatus for generating electrical energy or the like.

Each pair of adjacent floats 11 and 12 is provided with a single, or preferably with a plurality of transversely arranged accumulator units 31. Further, the number of accumulators 31 which can be utilized between each pair of floats 11 and 12 will vary depending on the actuating capability of the floats, as well as on the space available.

In one embodiment of an accumulator 31 usable in the instant device, and as illustrated in FIG. 4, the fluid moving unit comprises a pump having a fixedly positioned first element, which operably receives a second, or movable element. As shown in FIG. 1, pump 31 is adapted to function in a submerged position beneath hinged rafts 11 and 12. The pump 31 is thus formed of a suitable metallic material or a fiberglass reinforced resin, which will resist deterioration due to the normal problems presented by operating in a salt water environment.

Referring to FIG. 4, pump 31 includes primarily elongated cylinder or casing 36 having a dished head 37 and 38 fitted to each end. A pump chamber 39 is thereby defined between the respective ends. The chamber 39 inner wall 41 is sufficiently smooth to slidably accommodate the peripheral edge of seal member 42 thereagainst while forming a substantial fluid tight seal therewith.

Each casing end wall, 37, for example, is further provided with one or more valves 43. Said flow control members are preferably check valves, and more preferably a plurality of the latter, spaced about the head 37. These valves are so positioned to permit a unidirectional flow of water into chamber 39. As shown, each of the valves 43 is defined by a valve port 44 and a valve cover 46 which is hinged adjacent to the port. Thus, cover 46 will be displaced inwardly in response to water pressure on the outer side thereof, as pump piston 47 is moved longitudinally through chamber 39 and away from head 37.

Elongated pump piston 47 is slidably carried in the pump chamber 39 to be guided along the inner wall 41 thereof. The central plunger 48 is disposed in a manner that axially extending guide rods 49 and 51 are journalled at the respective end walls 37 and 38 in the closed ends of chamber 39.

In one configuration and as shown, pump piston 47 comprises coaxially arranged cylindrical shafts 49 and 51. These not only carry a flow of water therethrough, but are slidably registered within bearings 52 and 53 at the head ends. The respective guide rod ends are journalled to permit longitudinal movement of the piston as water is drawn into an end in response to movement of floats 11 and 12.

Piston plunger 48 comprises opposed dished members which are joined at their edges to define an inner compartment 52. Each plunger wall is provided with one, and preferably a plurality of check valves 50, 50a and 50b. Said valves are inwardly displaceable to permit liquid flow into compartment 56 from chamber 39, as the piston is urged toward an end wall.

As noted, the outer peripheral edge of piston 48 is provided with a sliding seal member 42. Thus, chamber 39 is divided into two distinct variable sized compartments as piston 47 is moved through chambers 39–39a.

To properly position pump 31, pump casing 36 includes mounting brackets 54 and 55 which depend from one end thereof. Said brackets are adapted to be fastened to the respective floats 11 and 12, at a point adjacent to the common hinged edge 13. Preferably fastening of pump 31 is made at the hinge pin assembly 26.

As shown, said mounting brackets 54 and 55 are positioned by virtue of ring bearings 56. The latter are adapted to slidably register on hinge pin 26 thus to permit a degree of movement of pump 31 as floats 11 and 12 adjust their relative positions.

When properly positioned, pump 31 is free to oscillate or adjust about its mounting brackets 54 and 55 in response to movement of either of the floats 11 or 12. However, because of its relationship to the latter members, casing 36 will remain relatively constant with respect to the hinge point.

Functionally, as accumulator 31 is actuated in response to movement of the adjacent floats 11 and 12, piston plunger 48 will be urged through pump chamber 39. To facilitate movement of piston plunger 48, each float is provided with a linkage structure 57 which extends downwardly from the floor of the float. In one embodiment, each linkage structure comprises equilength arms 58 and 59 which extend from each float to a common juncture point 61 at the piston end.

Linkage 57 is further positioned by a downwardly extending structure 62. Said structure depends from the lower side of each float a sufficient distance to allow actuation of piston 47 within the limits of chamber 39.

Functionally, in response to wave movement, adjacently hinged rafts 11 and 12 will pivotally move about hinge assembly 13. As the piston 47 advances toward end wall 38, water will be drawn into chamber 39a through valves 43.

Concurrently, check valves 46 will be forced open, while 53a are forced to closed position. Water will thus be forced from compartment 39a, into compartment 56. Thus influx of water will then be urged from pump 31 by way of the conduit guide rods 49 and 51. Said conduits can each include a check valve 61 and 62 which are operable to permit unidirectional flow through the respective conduits.

The pressurized streams of water will then be urged into common conduit 34 by way of the flexible conduit section 35. Thus, for each reciprocatory movement of plunger 47, water will be forced under pressure into the central accumulator on platform 14.

It is appreciated that to maintain unidirectional water flow conduit 34 will be provided with the necessary check valves and regulators such that there will be a controlled feed to the platform based central accumulator.

While not presently shown in detail, means is further provided to limit pivotal movement of the respective floats about hinge point 13. Thus, under storms, or excessively turbulent water conditions, the floats will be protected by suitable shock absorbers or similar members so disposed to minimize severe float movement.

Other modifications and variations of the invention as hereinbefore set forth can be made without departing from the spirit and scope thereof, and therefore, only such limitations should be imposed as are indicated in the appended claims.

I claim:

1. In combination with a wave articulated facility adapted to be floatably positioned in a body of water and having at least two adjacently positioned rafts which are hinged along a common pivot edge to permit independent movement of each raft about said pivot edge in response to wave movement beneath the facility, and flow conduit means carried on the facility to conduct pumped water therethrough, a double acting pump operably carried on said facility and comprising an elongated casing having opposed end walls, one end thereof being pivotally engaged with the respective adjacently positioned rafts at said pivot edge, and said casing being communicated with said body of water through check valve means formed at opposite ends of said casing to permit entry of water into the casing, a double ended piston disposed within said elongated casing having a valved plunger in slidable registry with the casing inner wall, which valved plunger includes an inner compartment, check valves at opposed longitudinal ends of said plunger, being operable to open into said compartment whereby to admit water to said inner compartment when the plunger is reciprocated, a pair of hollow shafts defining flow passages, and disposed coaxially with said casing and with each other, each being suitably registered at the casing ends to permit reciprocatory movement of the piston through the casing, said respective hollow shafts having an inner end thereof connected to said valved plunger, and being in communication with the inner compartment thereof, check valve means in the respective shafts being operable to permit a unidirectional flow of water from said inner compartment into the respective hollow shafts and the latter being communicated with said flow conduit means on said facility to direct flows of water therethrough, whereby relative movement between adjacently positioned hinged rafts will cause reciprocal movement of said double ended piston through the pump casing and urge a flow of water through the respective flow conduits.

2. In the apparatus as defined in claim 1, wherein said double acting pump is disposed beneath said adjacently positioned rafts.

* * * * *